United States Patent
Hong

(10) Patent No.: US 7,430,181 B1
(45) Date of Patent: Sep. 30, 2008

(54) METHOD AND APPARATUS FOR AUTOMATICALLY CONFIGURING DEVICES ON A WIRELESS NETWORK

(75) Inventor: Jay Wu Hong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 10/722,993

(22) Filed: Nov. 26, 2003

(51) Int. Cl.
*H04L 12/28* (2006.01)

(52) U.S. Cl. ...................... 370/254; 370/338
(58) Field of Classification Search ............. 455/270, 455/419, 422.1, 436; 370/254, 255, 328, 370/329, 332
See application file for complete search history.

(56) References Cited

U.S. PATENT DOCUMENTS

| | | | |
|---|---|---|---|
| 6,775,559 B1* | 8/2004 | Weghorst et al. | 455/558 |
| 6,788,959 B2* | 9/2004 | Jokinen et al. | 455/552.1 |
| 7,003,295 B1* | 2/2006 | Cook et al. | 455/435.1 |
| 7,133,526 B2* | 11/2006 | Whelan et al. | 380/270 |
| 7,184,707 B2* | 2/2007 | Tada et al. | 455/41.3 |
| 7,289,631 B2* | 10/2007 | Ishidoshiro | 380/270 |
| 7,293,088 B2* | 11/2007 | Douglas et al. | 709/224 |
| 2001/0014593 A1* | 8/2001 | McCune | 455/127 |
| 2002/0012433 A1* | 1/2002 | Haverinen et al. | 380/247 |
| 2002/0184304 A1* | 12/2002 | Meade et al. | 709/203 |
| 2003/0003860 A1* | 1/2003 | Dwornik | 455/3.01 |
| 2003/0005290 A1* | 1/2003 | Fishman et al. | 713/156 |
| 2003/0035545 A1* | 2/2003 | Jiang | 380/272 |
| 2003/0143946 A1* | 7/2003 | Grzeczkowski | 455/3.05 |
| 2003/0169722 A1* | 9/2003 | Petrus et al. | 370/347 |
| 2004/0082327 A1* | 4/2004 | Kim et al. | 455/435.2 |
| 2004/0198319 A1* | 10/2004 | Whelan et al. | 455/411 |
| 2004/0229612 A1* | 11/2004 | Narayanan et al. | 455/435.1 |
| 2004/0266449 A1* | 12/2004 | Smetters et al. | 455/452.1 |
| 2005/0048963 A1* | 3/2005 | Kubler et al. | 455/423 |
| 2005/0048997 A1* | 3/2005 | Grobler et al. | 455/550.1 |
| 2005/0101340 A1* | 5/2005 | Archiable | 455/522 |

OTHER PUBLICATIONS

Hiner, J. "Configuring a Wireless LAN Connection in Windows XP." Jul. 10, 2002. Online article from CNET Asia (www.asia.cnet.com). URL: http://www.asia.cnet.com/itmanager/tech/0, 39006407 , 39049520, 00.htm.

Monaly Jr., J. "General Wireless Networking (WLAN) Configuration Guide." May 22, 2002. Online guide, Information Technology Services, California Institute of Technology, Pasadena, CA. Found on http://www.its.caltech.edu/its/.

"Configure Wireless Wlan-Ng Drivers with PCI-PCMCIA Adapter and a DWL-65." From *All Things UNIX Forum FAQ*. Dowloaded Mar. 7, 2003 from broadbandreports.com. URL: http://www.dslreports.com/faq/6025.

* cited by examiner

*Primary Examiner*—Kwang B. Yao
*Assistant Examiner*—Kenan Cehic
(74) *Attorney, Agent, or Firm*—Dov Rosenfeld Inventek

(57) ABSTRACT

A method, an apparatus, and a carrier medium carrying programming instructions to wirelessly configure a station of a wireless network. The method, in a first wireless station of a wireless network, includes determining if a configuration request message has been wirelessly received from a second wireless station. The method further includes generating a configuration data message for the second wireless station including one or more configuration parameters for the second wireless station. The method further includes wirelessly transmitting the configuration data message to the second wireless station. A user can use a device implementing the method to configure the second wireless station.

44 Claims, 8 Drawing Sheets

METHOD AND APPARATUS FOR AUTOMATICALLY CONFIGURING DEVICES ON A WIRELESS NETWORK

BACKGROUND

Wireless networks can be ad-hoc, or have an infrastructure that includes a wireless station, called an access point (AP), through which all other wireless stations, also called client stations, communicate. Such infrastructure networks are now in common use, e.g. as wireless local area networks (WLANs). For example, the IEEE 802.11 standard in all its variations, herein referred to as 802.11, is now in common use for WLANs. 802.11 defines an infrastructure network having an AP through which all other client stations of the same infrastructure network, also called a basic service set (BSS), communicate.

Home or Small Office or Home Office (SOHO) users are able to implement WLANs within their existing computer infrastructure by installing and configuring commonly available wireless devices. Devices such as wireless adapter cards can convert desktop computers or portable computers into wireless stations. Other wireless, devices are themselves wireless stations, such as standalone APs in the case of 802.11.

Such wireless devices are commonly available and are relatively straightforward to install. Configuring the devices, however, is not so simple. Many home or SOHO users find configuring wireless stations to be a frustrating and difficult experience. Configuration parameters must be set before a client station or an AP can function properly on a WLAN. Configuration parameters for a client station include parameters detailing which protocol and transmission mechanism to use, a station's host address, available services on the network, etc.

There are existing methods that can provide configuration parameters to a client station, even with limited or no user intervention. However, some most important and fundamental parameters to WLAN communication, and commonly ones that one must be set manually, are security parameters such as security keys. It is the security key that is difficult for home or SOHO to configure on wireless stations.

WLANs typically provide one or more security mechanisms to limit the vulnerability of eavesdropping, unauthorized use and/or potentially malicious activity. In the case of the IEEE 802.11 family of protocols, several such security methods exist. Wired Equivalent Privacy (WEP) encryption is a commonly used method for 802.11 WLANs to provide client station authorization and point-to-point encryption between the client station and the AP. To enable this feature, an AP generates a security key, also called a WEP key, that must be provided to a client station. For each client station that is to use WEP encryption, a user reads up to 104 characters provided by the AP, and then enters these characters into the client station. As additional client stations are added to the WLAN, the user must repeat this process for each client station.

Wireless security mechanisms, in general, require at least one configuration parameter, e.g. a security key, that is to be transferred from one wireless station to another wireless station. The security key must not be communicated openly such that it can be eavesdropped, lest the security mechanism be rendered ineffectual. But it is the step of transferring the security key from one wireless station to another that many home or SOHO users find unacceptable—too difficult and/or too cumbersome—to perform regularly. As a consequence, many home and SOHO users today do not enable wireless security mechanisms, leaving their WLANs particularly vulnerable to eavesdropping and unauthorized use.

Thus there is a need in the art for a method and apparatus that can provide one or more configuration parameters to wireless stations on a WLAN with little or no user-intervention.

SUMMARY

The invention provides a method, a carrier medium and an apparatus for transmitting one or more configuration parameters from one station, e.g., an AP to one or more stations desiring to be client stations, with little or no user intervention, while limiting the inadvertent reception of the configuration parameters. As an example using the preferred embodiment of the invention, a user takes a client station, such as a mobile laptop computer with an 802.11 wireless device, close to an AP, presses a button on the AP, and the laptop becomes configured to access the WLAN. In the process of configuring the laptop, the AP minimizes the power of the RF signal transmitted during the communication, and thus limits the probability of inadvertent reception of the configuration parameters.

Disclosed herein is a method in a first wireless station of a wireless network. The method includes determining if a configuration request message has been wirelessly received from a second wireless station. The method further includes generating a configuration data message for the second wireless station including one or more configuration parameters for the second wireless station. The method further includes wirelessly transmitting the configuration data message to the second wireless station. A user can use a device implementing the method to configure the second wireless station.

Also disclosed herein is a carrier medium carrying at least one computer-readable code segment to instruct a processor of a processing system to implement a method in a first wireless station of a wireless network. The method includes the steps in the preceding paragraph.

Also disclosed herein is an apparatus in a first wireless station of a wireless network. The apparatus includes a means for wirelessly receiving. The apparatus further includes a means for wirelessly transmitting. The apparatus further includes a means for responding to wirelessly receiving a configuration data message from a second wireless station. The responding includes extracting one or more configuration parameters from the configuration data message. The responding further includes applying the one or more configuration parameters to the first wireless station. A user can use the apparatus to configure the second wireless station.

Also disclosed herein is a method in a first wireless station of a wireless network. The method includes determining if a configuration data message has been wirelessly received from a second wireless station. The method further includes extracting one or more configuration parameters from the configuration data message. The method further includes applying the one or more configuration parameters to the first wireless station. A user can use a device implementing the method to configure the first wireless station.

Also disclosed herein is a carrier medium carrying at least one computer-readable code segment to instruct a processor of a processing system to implement a method in a first wireless station of a wireless network. The method includes the steps in the preceding paragraph.

Also disclosed herein is an apparatus in a first wireless station of a wireless network. The apparatus includes a means for wirelessly receiving. The apparatus further includes a means for wirelessly transmitting. The apparatus further includes a means for responding to wirelessly receiving a configuration data message from a second wireless station. The responding includes extracting one or more configuration parameters from the configuration data message. The responding further includes applying the one or more configuration parameters to the first wireless station. A user can use the apparatus to configure the first wireless station.

DETAILED DESCRIPTION

Figure 8:
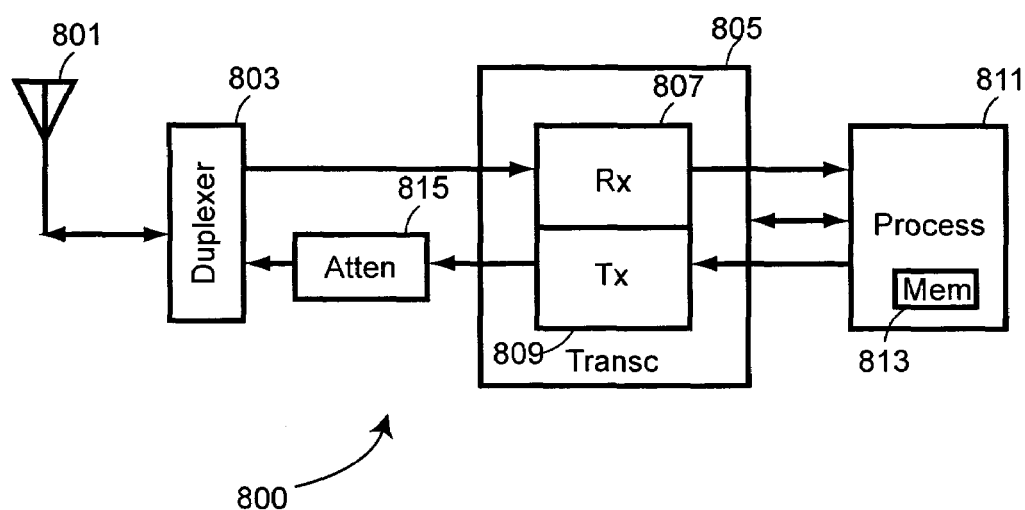
FIG. 8 shows a wireless station that may be used as the first station, e.g., an access point, or a second station, e.g., a client station according to aspects of the present invention.

FIG. 8 shows a simplified block diagram of a wireless station 800 of a wireless network in which aspects of the present invention may be embodied. The client station is typical, and may be the access point or the to-be-configured client station in different implementations. The station 800 includes an antenna 801, used here to include the possibility of several antennas used with diversity. The antenna a coupled to a wireless transceiver 805 that includes a receiver 807 to wirelessly receive a message from another station, and a transmitter 809 to wirelessly transmit a message. Also included is a processor 811 coupled to the receiver and transmitter to control certain aspects of the operation, including, in one embodiment, implementing aspects of the present invention. One version of the processor is a programmable processor that includes a program, e.g., stored in a memory 813.

The embodiment shown here is for half-duplex operation and includes a duplexer 803 between the antenna and the transceiver. Also included is an attenuator 815 between the transmitter and antenna 801 to attenuate the signal in order to limit the transmit power. Those in the art will understand that in an actual implementation, many methods are available to attenuate a signal, and any such method may be used to implement the output transmit power limiting aspects of the present invention.

Configuration Sequence

One aspect of the invention defines a communication sequence between two stations of a wireless network, typically an AP and a client station, each of which may have the general architecture shown in FIG. 8. The sequence is herein called the configuration sequence. Those of ordinary skill in the art will be aware that there exist many variations of the configuration sequence within the scope of the invention. Thus, while several embodiments of the configuration sequence are described herein, the invention is not limited to those configuration sequences described in the description.

Figure 1:
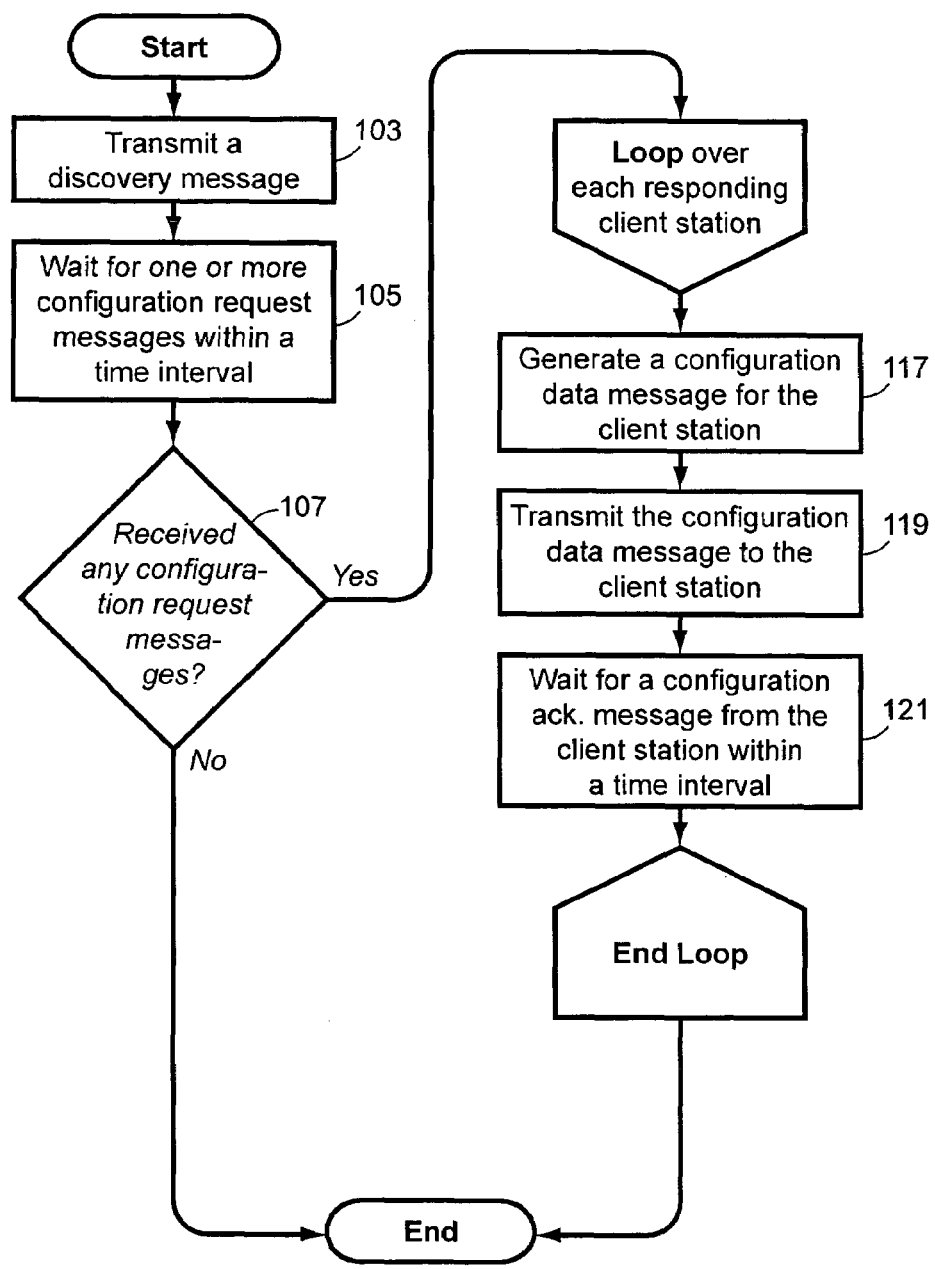
FIG. 1 shows a flowchart of an AP-implemented set of steps of an embodiment of a configuration method.

FIG. 1 shows a flowchart in an AP of one embodiment of the configuration sequence. The AP starts by transmitting a discovery message in a step 103 such that client stations can respond with a configuration request message if they are able to receive and decode the discovery message. The AP waits for a settable time interval for one or more configuration request messages in a step 105. If the AP in a step 107 determines that it received no configuration request messages within the time interval of step 105, then the AP-implemented configuration sequence ends.

Those of ordinary skill in the art will understand that arbitrary settable parameters, such as the settable time of step 105, can be fixed or modified by a number of methods and techniques. Such methods include but are not limited to setting the parameter to a fixed and unchangeable value in a particular embodiment of the invention (e.g. pre-setting the parameter during the manufacturing process), or allowing the parameter to be settable by a user during a configuration session, or allowing the parameter to be modified dynamically according to processes in the invention, or any combination thereof. Thus, any reference to a "settable" parameter in any embodiment of the invention is not limited to any method explicitly mentioned or implied in the description or claims of the application.

In one embodiment of the invention, the AP processes each client station that responds in the time interval of step 105, and such processing is assumed below. In one alternate to step 105, the AP waits until either a settable time interval has expired, or a configuration request message is received, such that only one client station is processed and configured in the remaining steps of the configuration sequence.

Thus, processing for all responding client stations will be assumed in the following.

If one or more configuration request messages have been received by the AP within the time interval of a step 105, then the AP carries out a set of steps, i.e., loops (iterates) over a set of steps for each of the responding client stations, e.g. generating a list of responding client stations and choosing one client station at a time to process. Those of ordinary skill in the art will be aware that there exist many methods for looping or iterating over a set of items. Hence, looping in any embodiment of the invention is not limited to any particular looping method described or implied in the description or claims of the application.

For each responding client station, the AP processes the client station, including generating a configuration data message for the client station in a step 117, transmitting the configuration data message to the client station in a step 119, and waiting within a settable time interval for a configuration acknowledgement message from the client station in a step 121.

In one embodiment of the invention, if the AP receives no configuration acknowledgement message from the client station within the time interval of a step 121, then the AP reprocesses the client station, e.g. steps 117, 119 and 121, until either a configuration acknowledgement message has been received, or a maximum number of reprocessing steps has occurred. In another embodiment of the invention, the AP records whether or not it received a configuration acknowledgement message of step 121.

Figure 2:
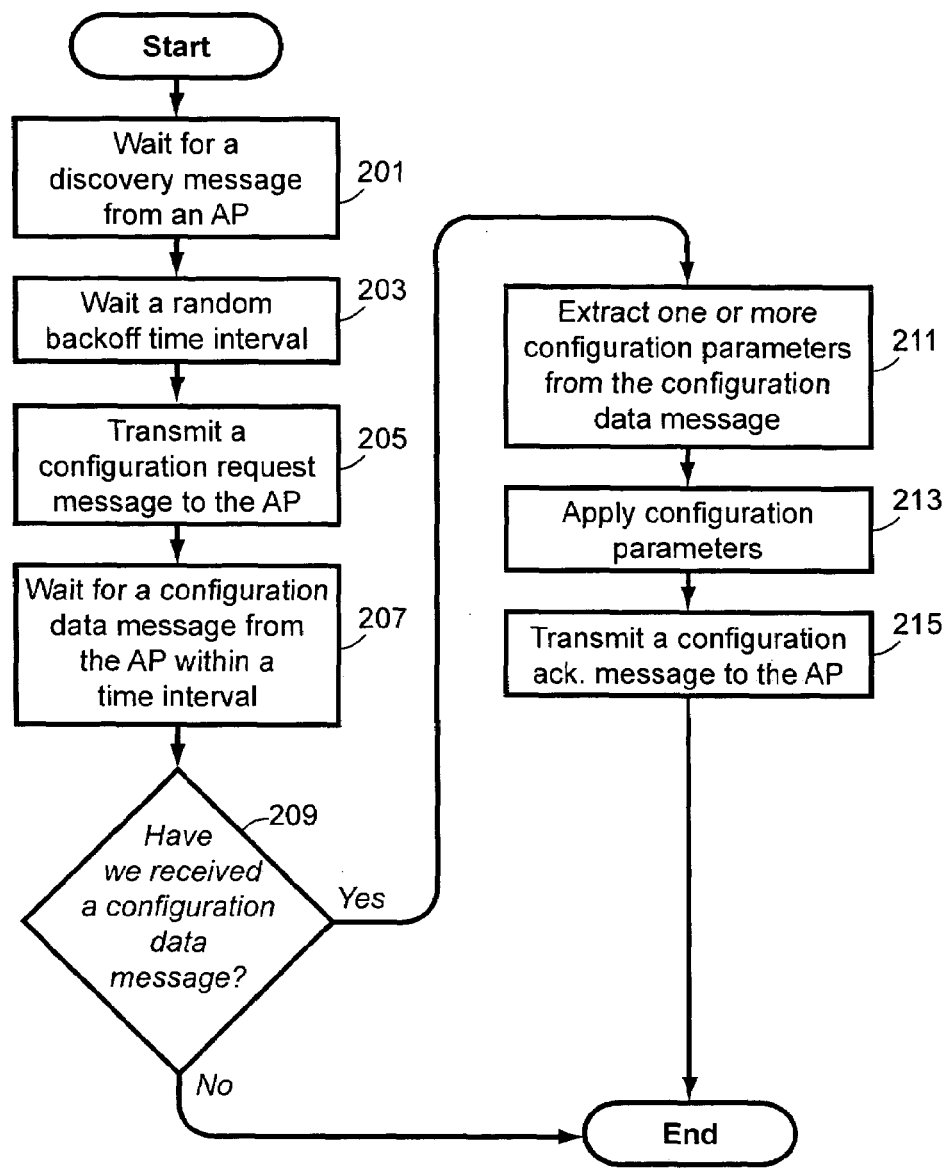
FIG. 2 shows a flowchart of a client station-implemented set of steps of an embodiment of a configuration method.

FIG. 2 shows a flowchart in a client station of a configuration sequence embodiment corresponding to the AP-implemented sequence of FIG. 1. In a step 201, the client station is typically in a state in which it waits for a discovery message from an AP. As a result of receiving a discovery message from a particular AP, the client station waits a random backoff time interval in a step 203 to minimize the occurrence of configuration request message collisions from other client stations, transmits a configuration request message to the AP in a step 205, and waits for up to a settable time interval for a configuration data message from the AP in a step 207.

If the client station in a step 209 determines that it received no configuration request message within the time interval of step 207, then the client station-implemented configuration sequence ends.

If a configuration data message has been received by the client station within the time interval of a step 207, then the client station extracts one or more configuration parameters from the configuration data message in a step 211, applies the configuration parameters in a step 213, and transmits a configuration acknowledgement message to the particular AP in a step 215. Once the AP configures the client station(s), the configuration sequence in the AP ends.

In the embodiment described above, the client station executes steps 211, 213, and 215 for the first configuration data message to be received and decoded by the client station.

In an alternate embodiment of the invention, the client station waits for one or more configuration data messages from one or more APs within a time interval. The configuration in a client station proceeds as previously described if the client station receives zero or one configuration data message. If the client station receives more than one configuration data message, the client station processes only one configuration data message in steps 211, 213 and 215 as described above according to a criteria.

In one embodiment of the invention as described in the preceding paragraph, the criteria includes choosing the configuration data message that was first to be received and decoded. In another embodiment of the invention in the preceding paragraph, the criteria includes choosing a configuration data message with the greatest average signal strength.

In one embodiment of the invention, step 203 is not used in the client station-implemented configuration sequence of FIG. 2.

In another embodiment of the invention, steps 201, 203 and 205 are not used in the client station-implemented configuration sequence of FIG. 2, and steps 103 is not used in the AP-implemented configuration sequence of FIG. 1. Instead, the client station, as opposed to the AP, starts (e.g. initiates) the configuration sequence. The client station starts by transmitting (e.g. broadcasting) a configuration request message to all stations in lieu of step 205, such that one or more APs able to receive and decode the configuration request message execute an AP-implemented step 107, and subsequently the one or more APs execute steps 117, 119 and 121 as described above to configure the client station.

Additional embodiments of the configuration sequence are described in the remainder of the detailed description.

Thus, those of ordinary skill in the art will appreciate that a number of steps may be added, altered or removed in any configuration sequence embodiment (AP- or client station-implemented) described in the description or claims of the application without reducing the functionality or interoperability. Thus, the invention incorporates all such modifications to any configuration sequence as alternate embodiments of the invention.

RF Security

Another aspect of the invention reduces the probability of inadvertent reception of configuration parameters transmitted by an AP to a client station. In one embodiment, this is achieved by limiting the output RF power level of transmitted signals, e.g., by providing a calculated amount of attenuation to the transmitted signals. This aspect is herein called RF security.

A wireless network transmitter coupled to an antenna, e.g., one with an omnidirectional, such as typically found on an AP, cannot directly control which wireless receivers are able to receive its transmitted signals. Any compatible wireless network receiver with sufficient sensitivity and within sufficient range of the transmitter will be able to receive signals transmitted by the wireless transmitter. By reducing the power of the transmitting signals, the range of reception of the signals, that is, the region in which a wireless station can receive and decode the signals, is limited.

Those of ordinary skill in the art will understand that there exist many known methods of limiting the output RF power. While the one embodiment of the invention suggests a variable attenuator coupled between the antenna and a wireless transceiver, an alternate embodiment includes electronically reducing the size of the signal prior to power amplification in the transmit part of the transceiver at the AP. The invention is limited to any one method of limiting the output RF power.

Figure 3:
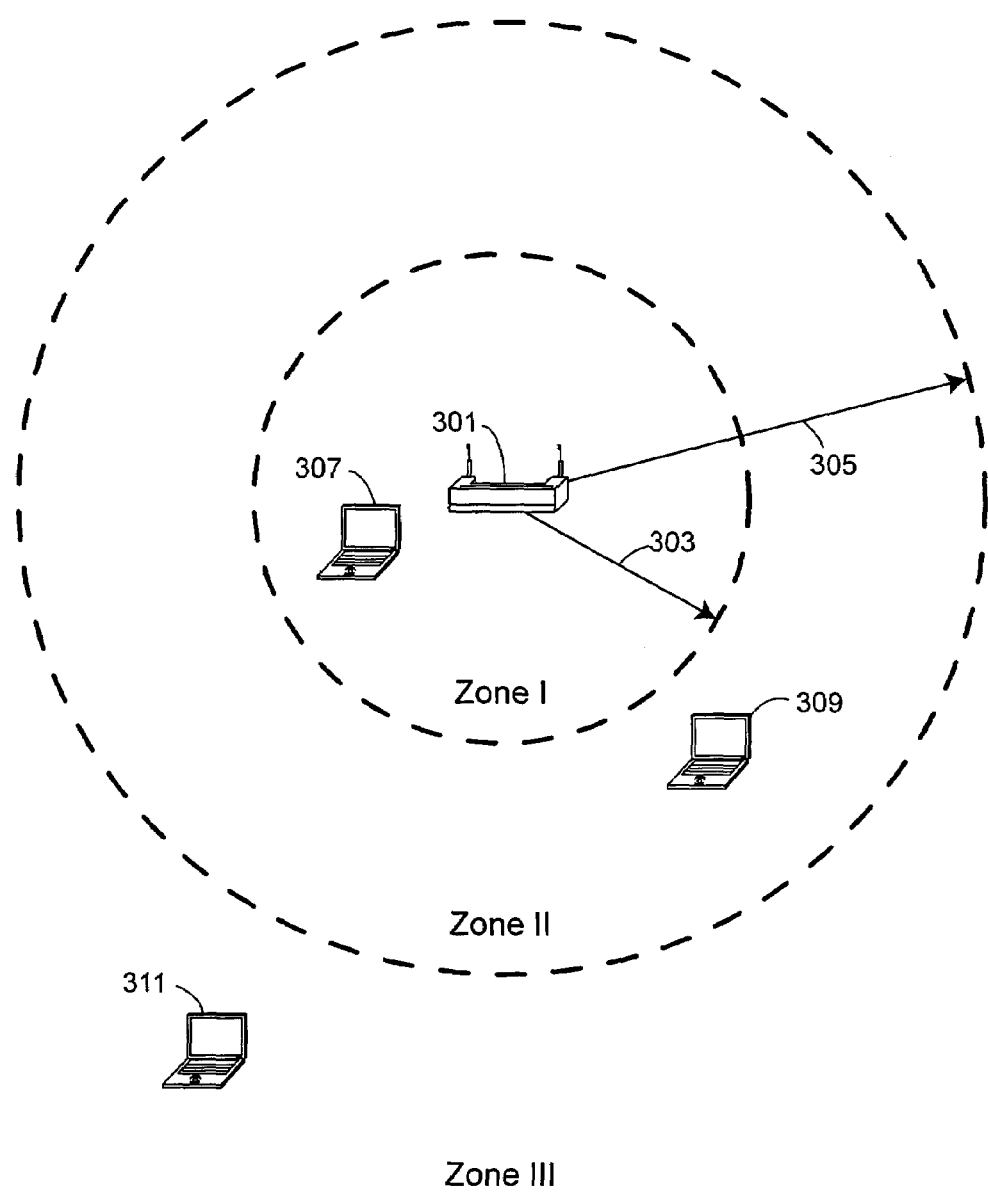
FIG. 3 shows an example of RF security in a BSS establishing three security zones.

FIG. 3 shows, by way of a simple example, a BSS in a WLAN with three zones defined by an AP 301, a minimum broadcast distance 303, and a maximum broadcast distance 305. The zones shown assume free-space loss, with the devices all at the same horizontal plane. Inside the minimum broadcast distance 303 defines a zone, Zone I, wherein a client station, e.g., client station 307 will be able to receive and decode signals transmitted by the AP 301. Outside the maximum broadcast distance 305 defines a zone, Zone III, wherein a client station, e.g., client station 311 will be unable to receive and decode signals transmitted by the AP 301. Between Zone I and Zone III defines a zone, Zone II, wherein a client station, e.g., station 309 may or may not be able to receive and decode signals transmitted by the AP 301.

For purposes of implementing the RF security of the invention, the inventor has found that free space loss provides an adequate approximation of the real RF power loss of RF transmissions. One model of free-space loss of a signal of frequency f over distance d is given by:

Free Space loss=20 log $f$+20 log $d$−37.85 where the loss is in dB, f in MHz, and d in feet.

For example, the free space loss of a 2.4 GHz signal at 3 feet using the above model would be about 40 dB. If an AP were transmitting a signal at −30 dBm, the power received at 3 feet under free space loss would be about −70 dBm. Since a typical 802.11 receiver has sensitivity between −70 dBm and −90 dBm, the 3 foot distance corresponds to the minimum broadcast distance 303 for an AP 301 transmitting at −30 dBm. Furthermore, if an AP were transmitting a signal at −30 dBm, the free space loss at 30 feet using the above model would be about 60 dB, and thus the power received at 30 feet under free space power loss would be about −90 dBm. Hence, the 30 foot distance corresponds to the maximum broadcast distance 305 for an AP 101 transmitting at −30 dBm.

One embodiment of a method of providing RF security includes setting the AP's output RF power level used during a configuration sequence to a relatively low power level, thus reducing the range of reception. The method is called "low power RF security" herein. Users that are authorized to receive configuration parameters can move their client stations close to the AP, into Zone I of FIG. 3, before beginning the configuration sequence. Unauthorized client stations, presumably those further away from the AP as in Zone III of FIG. 3, have a reduced probability of receiving and decode configuration parameters transmitted by the AP during a configuration sequence.

Another method embodiment that provides RF security includes setting the AP's output power level to a very low output RF power level, then stepping up the output RF power level until one or more client stations respond. This method is called "stepped RF security" herein. Similarly to the low power RF security method, those client stations that are close to the AP will become configured, while those client stations that are further away will be unable to receive configuration parameters transmitted during a configuration sequence.

Figure 4:
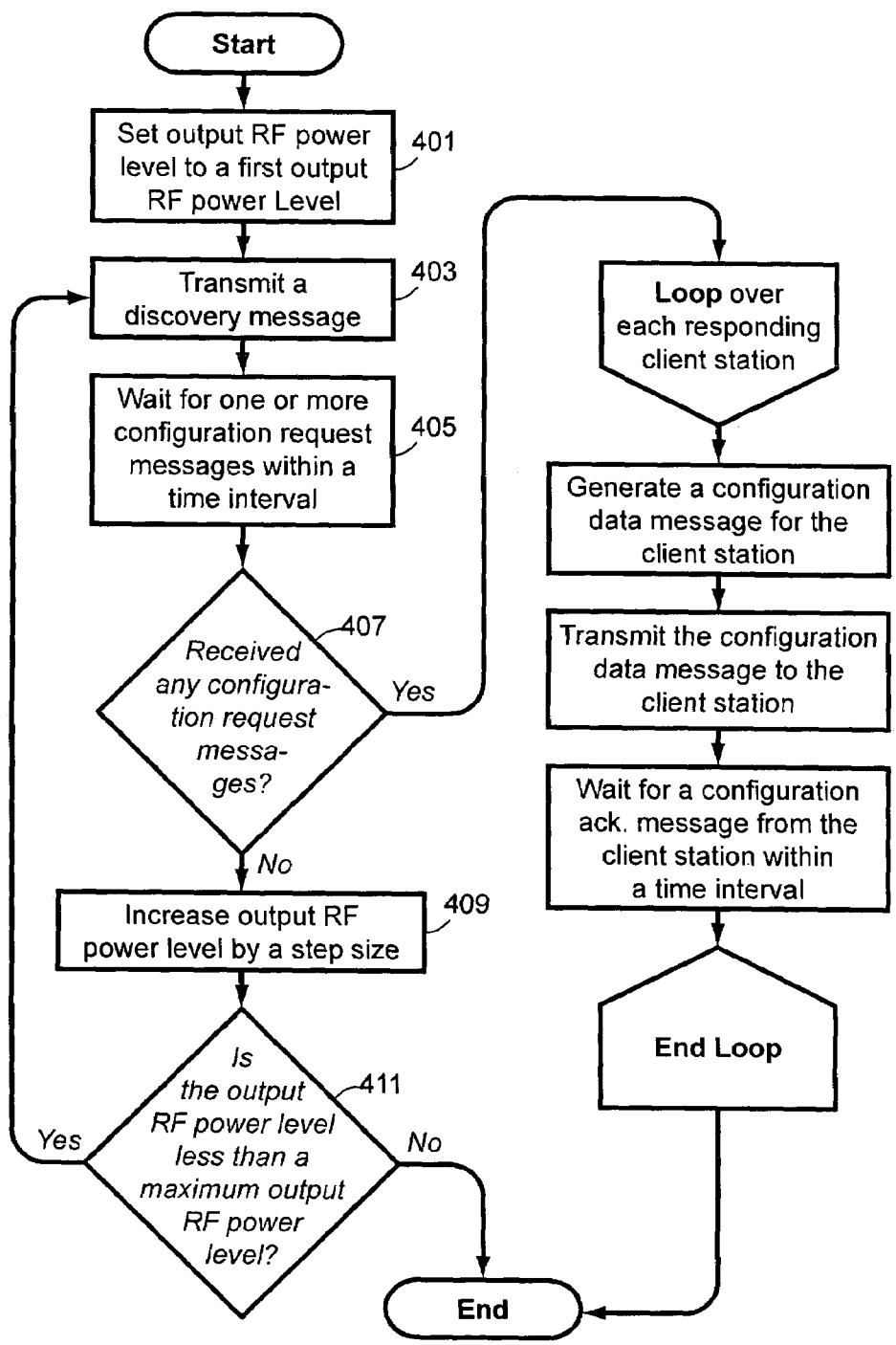
FIG. 4 shows a flowchart of an AP-implemented set of steps of an embodiment of a configuration method that includes stepped RF security.

FIG. 4 shows a flowchart in an AP of one embodiment of the configuration sequence that includes the stepped RF security method. In a step 401, the AP initially sets its output RF power level to a settable first RF power level. In one embodiment, the first RF power level is relatively low and is calculated such that very few, if any, client stations will be able to receive and decode any transmitted discovery messages. In a step 403, the AP transmits a discovery message such that an appropriately equipped client station that receives the discovery message will respond with a configuration request message.

In a step 405, the AP waits for a settable time interval for one or more configuration request messages. If the AP receives no configuration request messages within the time interval in an ascertaining step 407, then in a step 409 the AP increases the output RF power level by a settable step size. If the output RF power level is not greater than a settable maximum output RF power level in an ascertaining step 411, then the AP repeats the sequence of steps 403 (transmitting), 405 (waiting for a response), 407 (ascertaining), and if no response, steps 409 (increasing the power), until a maximum output RF power level is reached.

If one or more configuration request messages have been received by the AP within the time interval of step 405, the AP follows the configuring steps as described above and shown in FIG. 1.

Once the AP configures the client station(s) or the maximum power level is reached, the configuration sequence in the AP ends.

OTC Protocol

The preferred embodiment of the invention defines a protocol, herein called the One Touch Configuration (OTC) protocol, to implement a configuration sequence in a WLAN substantially conforming to the IEEE 802.11 WLAN protocol, referred herein simply as "802.11".

The OTC protocol defines an OTC packet, embedded in an 802.11 sub network access protocol (SNAP) packet which substantially conforms to the IEEE 802.2 SNAP specification.

Figure 5:
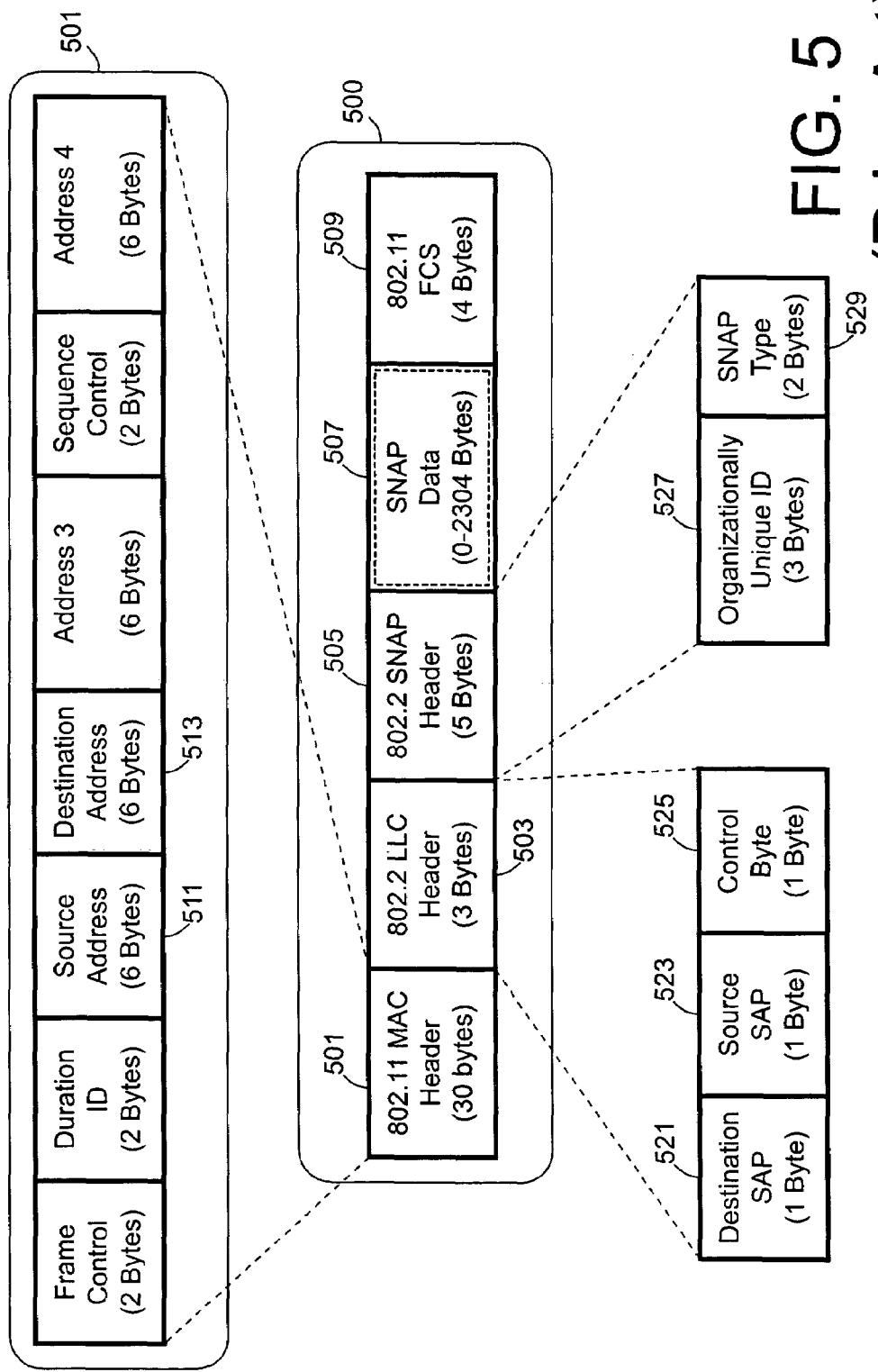
FIG. 5 shows a packet level description of an 802.11 SNAP packet.

FIG. 5 shows a prior art packet level description of an 802.11 SNAP packet. The 802.11 SNAP packet 500 consists of an 802.11 media access control (MAC) header 501, an 802.2 logical link control (LLC) header 503, an 802.2 SNAP header 505, the SNAP data 507 and an 802.11 frame check sequence (FCS). The 802.11 MAC header 501 consists of many fields, including a source address field 511 and a destination address field 513.

The LLC header 503 includes three fields, the destination SAP field 521, the source SAP field 523, and the control byte field 525. The OTC protocol defines the three fields to be 0xAA, 0xAA and 0x03 respectively.

The SNAP header 505 consists of two fields, the organizationally unique ID (OUI) field 527 for including the OUI, and the SNAP type field 529 that defines a type. The OTC protocol defines the two fields to be 0x007777 and 0x00, respectively. The OUI field is typically defined and distributed by IEEE. The value 0x007777 is used in this detailed description by way of example for descriptive purposes only.

Figure 6:
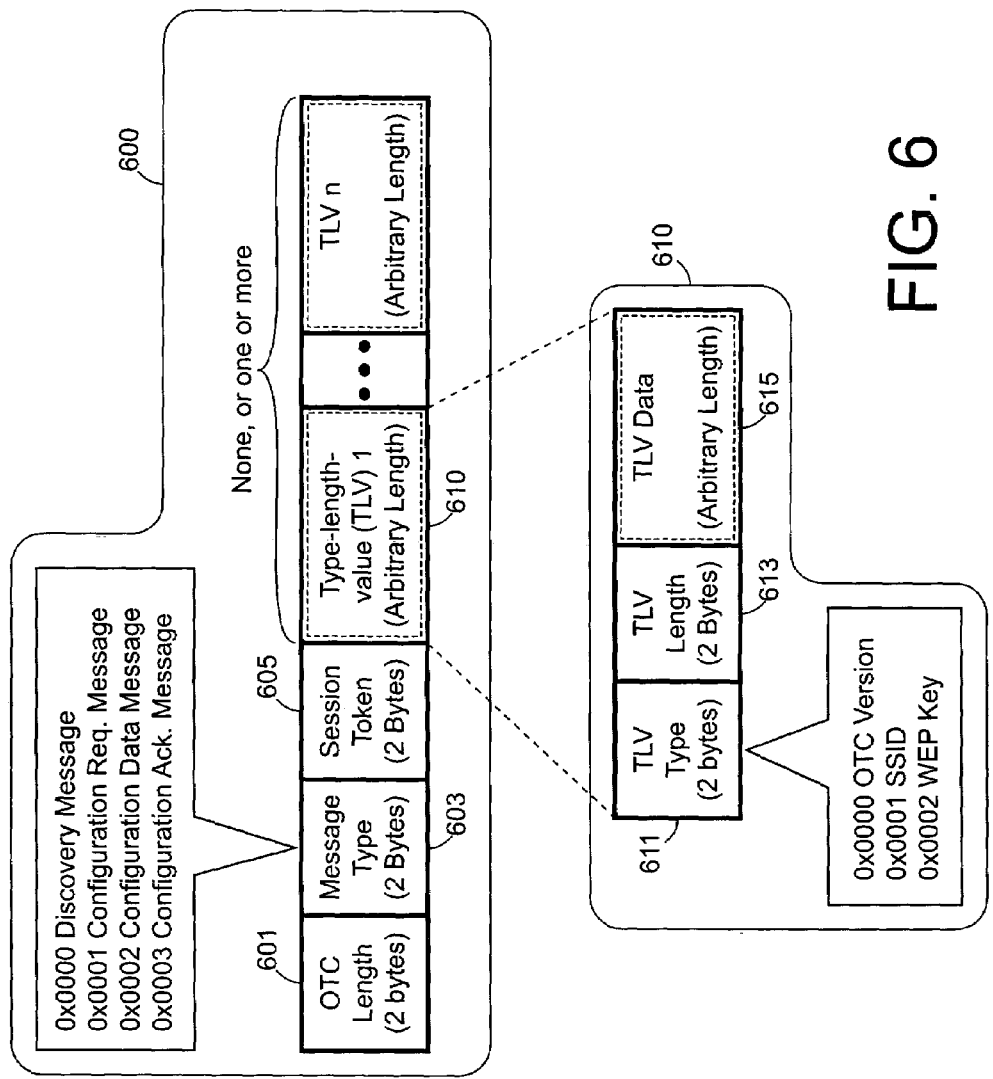
FIG. 6 shows a packet level description of an One Touch Configuration (OTC) packet, including example constants for OTC type and type-length-value (TLV) type according to an aspect of the present invention.

FIG. 6 shows a packet level description of the OTC packet, embedded in the SNAP data field in the preferred embodiment. The OTC packets includes an OTC length field 601, a message type field 603, a session token field 605, and optionally one or more packets, called "type-length-value" (TLV) packets because each includes a type, a length, and a value field that can be any length. FIG. 6 shows n TLV fields, but is to be understood that an OTC packet can include none, or at least one TLV field.

In one embodiment, the OTC length field 601 is a two-byte field that refers to the length in bytes of the entire OTC packet, and the OTC type field 603 is a two-byte field that refers to the type of packet as given in the following table:

TABLE 1

| Message Type | Description |
| --- | --- |
| 0x0000 | Discovery Message |
| 0x0001 | Configuration Request Message |
| 0x0002 | Configuration Data Message |
| 0x0003 | Configuration Ack. Message |

The session token field 605 is a two-byte field used to differentiate sessions of the OTC protocol. A session can be used to differentiate different configuration sequence when multiple APs are in close proximity, or to differentiate different configuration sequences of a single AP executed at different times, or any combination thereof. A session token can be randomly generated or incrementally generated. The client station uses the same session token when responding to an AP.

One or more TLV packets are included in an OTC packet when additional information needs to be transmitted in an OTC packet, such as a configuration data message, which includes arbitrary configuration parameters.

In one embodiment, a TLV packet consists of a TLV type field 611, a TLV length field 613 and a TLV data field 615. The TLV type field 611 is a two-byte field that refers to the type of packet as given in the following table:

TABLE 2

| TLV Type | Description |
| --- | --- |
| 0x0000 | OTC Version |
| 0x0001 | SSID |
| 0x0002 | WEP Key |

In one embodiment, the TLV length field 613 is a two-byte field that refers to the length of the TLV data field 615, while the TLV data field consists of arbitrary data, such as a configuration parameter.

The following are three C pseudo-code data structures for the data fields corresponding to the three TLV types given in table 2:

```
// OTC Version TLV
struct TlvOtcVersion {
    uChar    OtcVersionMajor;   // OTC Major Version
    uChar    OtcVersionMinor;   // OTC Minor Version
};
```

-continued

```
// SSID TLV
struct TlvSsid {
    uChar    SsidLen;          // SSID String Length
    Char     SsidString[32];   // SSID String
};
// WEP Key TLV
struct TlvWepKey {
    uChar    WepKeySize;       // Size of WEP key in bits:
                               //    0xE0 - 64 bits, 0xF0 - 128 bits
    uChar    TxKey;            // WEP key for transmission:
                               //    0x01 - 1, 0x02 - 2,
                               //    0x03 - 3, 0x04 - 4
    uChar    WepKey1[13];      // WEP Key 1
    uChar    WepKey2[13];      // WEP Key 2
    uChar    WepKey3[13];      // WEP Key 3
    uChar    WepKey4[13];      // WEP Key 4
                               //    5 bytes are used with 64 bit keys
                               //    13 bytes are used with 128 bit keys
};
```

Note, in an one embodiment, 3 bytes are added to make 128 bits (16 bytes) by the AP and it is called IV. The key is however only 13 bytes.

OTC Protocol Example

Figure 7:
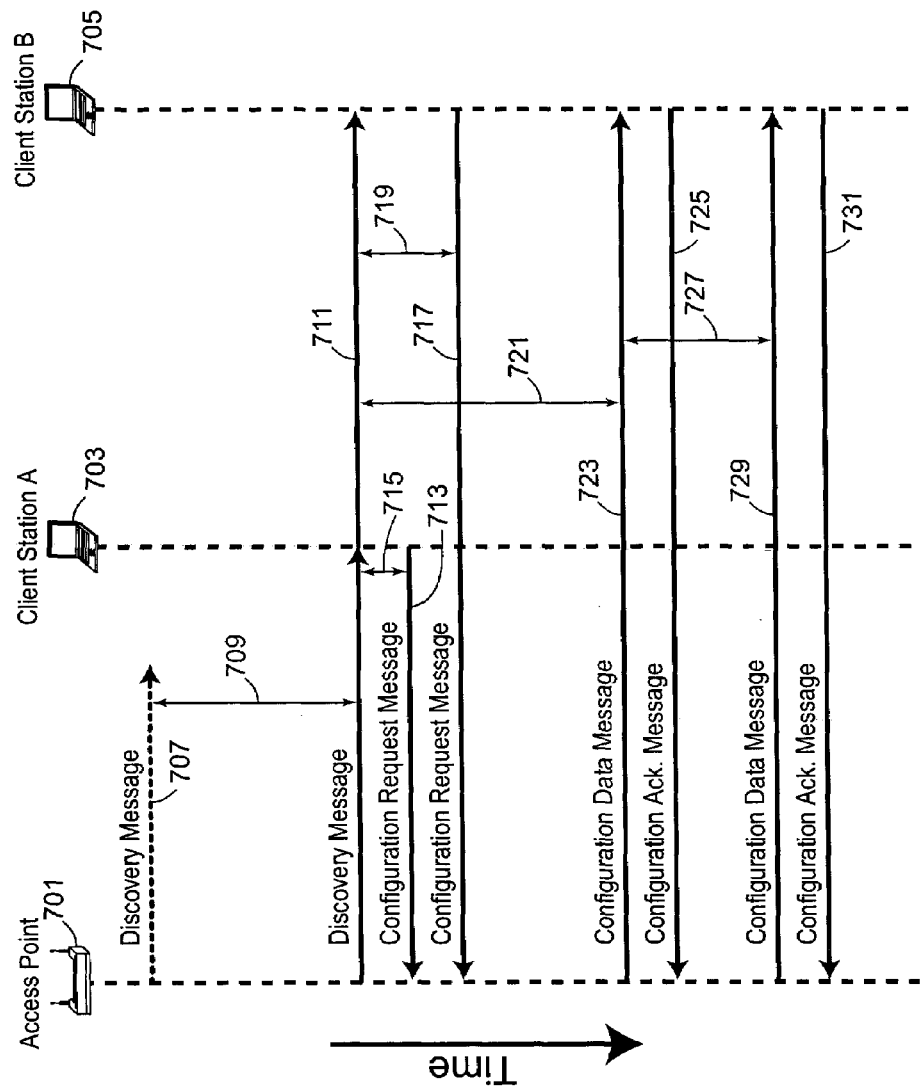
FIG. 7 shows a message-flow diagram of an example configuration sequence using the OTC protocol of an AP and two client stations according to an embodiment of the present invention.

FIG. 7 shows a message-flow diagram of an example configuration sequence of an AP and two client stations of an 802.11 WLAN according to an embodiment of the invention using the OTC protocol and stepped RF security. The horizontal lengths show the range of messages, but only as far as their intended destination(s). The vertical lengths show an elapse of time.

An access point 701 transmits a discovery message at a low output RF power level. Neither a first client station 703 (client station A) or a second client station 705 (client station B) can receive and decode the transmitted discovery message. The access point waits for a time interval 709, increases the output RF power level, and retransmits a discovery message 711.

This time, both client station A 703 and client station B 705 are able to receive and decode the transmitted discovery message. Client station A 703 waits a random backoff interval 715 and then transmits a configuration request message to the AP 713. Client station B 705 waits a random backoff interval 719 and then transmits a configuration request message to the AP 717. The AP waits for a time interval 721 for any configuration request messages to be received.

After waiting for a time interval 721, the AP generates a list of client stations to process, namely client station A and client station B. The AP 701 chooses a client station from the list, client station A 703 from FIG. 7, and generates a configuration data message for the client station. For example, the OTC packet of a configuration data message providing an SSID string and four 128-bit WEP keys could be as follows:

The AP transmits the configuration data message 723 to client station A 703, and waits a time interval 727 for a response. Client station A 703 receives the configuration data message 723, extracts and applies the configuration parameters from the configuration data message, then transmits a configuration acknowledgement message 725, to the AP 701.

After waiting a time interval 727, or upon receiving a configuration acknowledge message 725, the AP generates and transmits a configuration data message 729 for client station B 705 to client station B 705. Similarly, client station B 705 receives the configuration data message 729, extracts and applies the configuration parameters from the configuration data message, then transmits a configuration acknowledgement message 731 to the AP 701. The AP then quits the configuration sequence upon reception of the configuration acknowledgement message 731 from client station B 705.

ALTERNATE EMBODIMENTS

Client Selection and Invocation

One embodiment of the invention includes a method for selecting which client stations are to be configured. The preferred embodiment of the invention has two selection modes for a client station, which mode being selectable by a user-settable parameter.

In a client station, the automatic client selection mode, or what has already been described in the operation of the client station, directs a client station to always respond to discovery messages, and to always configure itself upon reception of a valid configuration data message. This mode enables a client station to be configured automatically by simply moving a client station into an automatic configuration zone, e.g. Zone I in FIG. 3. An AP repeatedly broadcasting discovery messages at a low power can automatically configure client stations with no user invention.

In a client station, the manual client selection mode is defined as selectively determining whether or not the client station is to be configured by either a user-settable parameter or a user interface. This mode enables a client station to be selectively configured based on user's input. This mode has the advantage that the client station will not unintentionally configure itself by moving within a zone that allows reception of discovery messages transmitted from an AP. One version incorporates this mode.

In one embodiment of the invention, the AP includes a user interface that allows the user to direct an AP to execute a configuration sequence. Upon receiving a command through the user interface, the AP begins a configuration sequence.

In another embodiment of the invention, an AP has two buttons. One button triggers the AP to execute a configuration sequence with one set of configuration parameters. The other

TABLE 3

| Value | 0x006B | 0x0002 | 0x0000 | 0x0000 | 0x0004 |
|---|---|---|---|---|---|
| Desc. | OTC Len. | Msg. Type | Sess. Token | TLV Type 1 | TLV Len. 1 |
| Value | 0x00 | 0x09 | 0x0001 | 0x0021 | 0x04 |
| Desc. | TLV Data 1 | | TLV Type 2 | TLV Len. 2 | TLV Data 2 |
| | OtcVersionMajor = | OtcVersionMinor | | | SsidLen |
| Value | "TEST\0\0 . . . \0" | 0x0002 | 0x0036 | 0xF0 | 0x02 |
| Desc. | TLV Data 2 | TLV Type 3 | TLV Len 3 | TLV Data 3 | |
| | SsidString | | | WepKeySize | TxKey |
| Value | XXXX | XXXX | XXXX | XXXX | |
| Desc. | | TLV Data 3 | | | |
| | WepKey1 | WepKey2 | WepKey3 | WepKey4 | | button triggers the AP to execute a discovery and configuration sequence with another set of configuration parameters. This embodiment enables a user to selectively apply different configuration needs to certain client stations, or to be able to replicate similar configuration parameters to multiple client station.

In another embodiment of the invention, a method for an AP and one or more client stations enables a user to initiate a configuration sequence remotely without having to physically access the AP. A user can direct, through a user interface on the client station, an AP to execute a configuration sequence. Upon receiving the command, the client station transmits a discovery request message. Upon receiving and decoding a discovery request message from a client station, an AP initiates a configuration sequence.

Configuration Generation

One aspect of the invention in an AP is the generation of a configuration data message. An important parameter to be included in the preferred embodiment of the configuration data message is the security key. Security keys, such as WEP keys, require a string of random (or pseudo-random) numbers to be generated.

Those of ordinary skill in the art will be aware that there exist many methods for generating random numbers. This invention is not limited to any particular method of generating random numbers. It should be appreciated that any method of generating random numbers can be incorporated into any embodiment of the invention that requires the generation of random numbers.

Result Display

In one embodiment of the invention, an apparatus is affixed to the AP that can convey the results of a configuration sequence. This will be discussed with the embodiment in mind that configures one client station per configuration sequence. That is, in the alternate to FIG. 1 wherein step 105 is replaced by waiting for waiting for either a settable time period to elapse, or for a response from a client station.

In one embodiment of the invention, a status and result display is affixed to the outside of an AP, and implemented by a light emitting diode (LED) to indicate the status a configuration sequence. In another embodiment of the invention, a blinking LED indicates to the user that the AP is in currently executing a configuration sequence. A steady lit green LED indicates that a configuration was successful, or a flashing red LED indicates that a configuration was not successful.

One embodiment of the invention provides a user interface to the AP that allows a user to set the maximum output RF power level parameter. Another embodiment provides a user interface to the AP, such that a user is able to set a configuration zone distance parameter, whereby AP automatically calculates a suitable maximum output RF power level parameter from the configuration zone distance parameter.

OTHER EMBODIMENTS

While the disclosure and claims make reference to "discovery message," "configuration request message," "configuration data message," and "configuration acknowledgement message," it should be appreciated that these terms are functional descriptions and do not rely on specific implementations or structures. Those of ordinary skill in the art will be aware that such messages may be embedded or encoded into arbitrary packets of a protocol or communication standard. Furthermore, such messages may also be grouped or combined with other packets or messages with similar or dissimilar functionality. All such variations, or combinations of such variations, are hereby incorporated as alternate embodiments of the present invention.

Those of ordinary skill in the art will be aware that there exist many variations of wireless communication standard implementing a number of different features. Some variations incorporate features such as guaranteed message delivery, collision avoidance, message integrity checking, etc. It should be appreciated that embodiments of the invention present little or no limitation to utilizing such variations. Thus, all variations that substantially conform to embodiments of the present invention are hereby incorporated as alternate embodiments of the invention.

In some embodiments of the invention, it may be the case that only a subset of the configuration parameters needed by a client station to participate on a wireless network are required to be sent during the configuration sequence. Other higher-level configuration protocols, e.g. Dynamic Host Control Protocol (DHCP), can provide additional, higher level configuration parameters to a client station. Thus, it should be appreciated that a client station may be configured utilizing an embodiment of the present invention by transferring as few as one configuration parameter from an AP to a client station.

Although the use of WEP keys is predominant in this disclosure, it should be appreciated that configuration data includes arbitrary information, including other types of security keys and certificates. Furthermore, embodiments of the invention are not limited to the context of the 802.11 WEP wireless security mechanism, and may utilize other contexts such as 802.1X, TKIP, WPA, and other wireless security mechanisms. All such contexts are hereby incorporated as alternate embodiments of the present invention.

While the embodiments described in this disclosure apply to devices used in the home or SOHO market, those of ordinary skill in the art will be aware that this does not reduce the applicability or restrict the applicability of this invention to the home or SOHO environment. It should be appreciated that medium and large sized organizations and enterprises can employ this invention within their own WLAN infrastructure to help reduce the cost and difficulty of large-scale WLAN deployment and maintenance. Thus, there is no explicit or implicit limitation of any embodiment of the invention to any particular field, application, circumstance, or setting.

It should be appreciated that the use of the terms "AP" (access point) and "client station" in the disclosure and claims does not limit the scope of any embodiments of the present invention to devices described by such labels. Those of ordinary skill in the art will be aware that an AP or client station may refer to an arbitrary communication device that meets the minimum functionality of wirelessly transmitting and receiving RF signals. Furthermore, it should be appreciated that a wireless station can function as an AP, or a client station, or both simultaneously. Thus, all such arrangements are hereby incorporated as alternate embodiments of the invention.

Please note that while aspects of the invention are described above using a OTC protocol, the invention is not limited to such a protocol. Alternate embodiments would use a different protocol.

It should be appreciated that although aspects of the invention have been described in the context of BSS of a wireless network, or the context of a WLAN substantially conforming to the IEEE 802.11 standard, the invention is not limited to such contexts and may be utilized in various wireless network applications and systems. Furthermore, embodiments or aspects of the invention are not limited to any one type of architecture or protocol, and thus, may be utilized in conjunction with one or a combination of other architectures/protocols. For example, the invention may be embodied in devices conforming to other standards and for other applications, including other WLAN standards, Bluetooth, IrDA, and other wireless communication standards. Thus, all such contexts are hereby incorporated as alternate embodiments of the invention.

It will also be understood that embodiments of the invention are not limited to any particular implementation or programming technique and that the invention may be implemented using any appropriate techniques for implementing the functionality described herein. Embodiments of the invention are not limited to any particular programming language or operating system.

One embodiment of each of the methods described herein is in the form of a computer program that executes on a processing system. Thus, as will be appreciated by those of ordinary skill in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, embodiments of the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method in a first wireless station of a wireless network, the method comprising:

wirelessly transmitting a discovery message;

waiting for a settable time interval to wirelessly receive a configuration request message from a second wireless station within the settable time interval the configuration request message being wirelessly transmitted by the second wireless station in response to the discovery message being wirelessly received by the second wireless station; and in the case the configuration request message is received within the settable time interval, generating a configuration data message for the second wireless station including one or more configuration parameters for the second wireless station, and wirelessly transmitting the configuration data message to the second wireless station, such that the second wireless station can be configured, wherein the transmitting of the configuration message is after waiting for a backoff time interval, and wherein the wirelessly transmitting the discovery message includes:

wirelessly transmitting the discovery message at a first output RF power level;

waiting for a configuration request message;

in the case that no configuration request message is wirelessly received within a period of time, wirelessly re-transmitting the discovery message at a higher output RF power level; and repeating such waiting and re-transmitting until either a maximum output RF power level has been reached, or a configuration request message has been wirelessly received, such that the range of reception of the wirelessly transmitted configuration data message is limited.

2. A method as recited in claim 1, wherein the first output RF power level is a relatively low level, such that the range of reception of the wirelessly transmitted configuration data message is limited.

3. A method as recited in claim 1, wherein the wirelessly transmitting the discovery message is in response to wirelessly receiving a command from a user.

4. A method as recited in claim 1, wherein the generating includes generating random numbers, and wherein configuration parameters includes a security key.

5. A method as recited in claim 1, wherein the first wireless station is an access point (AP) of the wireless network, and the second wireless station is to be a client station of the AP.

6. A method as recited in claim 5, wherein the wireless network substantially conforms to the IEEE 802.11 standard.

7. A method as recited in claim 5, wherein the configuration parameters includes a security key.

8. A method as recited in claim 6, wherein the configuration parameters includes a WEP key.

9. A method in a first wireless station of a wireless network, the method comprising:

wirelessly receiving a discovery message transmitted by a second wireless station;

wirelessly transmitting a configuration request message in response to wirelessly receiving the discovery message;

wirelessly receiving a configuration data message from the second wireless station, the configuration data message being transmitted by the second wireless station within a settable time interval in response to the second station receiving the configuration request message and after the second station waits for a backoff time interval;

extracting one or more configuration parameters from the configuration data message; and applying the one or more configuration parameters to the first wireless station to configure the first wireless station, such that the first wireless station can be automatically configured, wherein the transmitting of the discovery message by the second wireless station includes:

the second wireless station wirelessly transmitting the discovery message at a first output RF power level;

the second wireless station waiting for a configuration request message;

in the case that no configuration request message is wirelessly received by the second wireless station within a period of time, wirelessly re-transmitting the discovery message at a higher output RF power level; and the second wireless station repeating such waiting and re-transmitting until either a maximum output RF power level has been reached, or a configuration request message has been wirelessly received by the second wireless station, such that the range of reception of the wirelessly transmitted configuration data message is limited.

10. A method as recited in claim 9, wherein the first wireless station is configured only if a user selects the first wireless station to be configurable.

11. A method as recited in claim 9, wherein the wirelessly transmitting the configuration request message is in response to wirelessly receiving a command from a user.

12. A method as recited in claim 9, wherein the second wireless station is an access point (AP) of the wireless network, and the first wireless station is a client station of the AP.

13. A method as recited in claim 12, wherein the configuration parameters includes a security key.

14. A method as recited in claim 12, wherein the wireless network substantially conforms to the IEEE 802.11 standard.

15. A method as recited in claim 14, wherein the configuration parameters includes a WEP key.

16. A computer-readable medium encoded with computer executable instructions that when executed by a processor in a first wireless station of a wireless network cause carrying out a method in the first wireless station, the method comprising:

wirelessly transmitting a discovery message;

waiting for a settable time interval to wirelessly receive a configuration request message from a second wireless station within the settable time interval, the configuration request message being wirelessly transmitted by the second wireless station in response to the discovery message being wirelessly received by the second wireless station; and in the case the configuration request message is received within the settable time interval, generating a configuration data message for the second wireless station including one or more configuration parameters for the second wireless station, and wirelessly transmitting the configuration data message to the second wireless station, such that the second wireless station can be configured, wherein the transmitting of the configuration message is after waiting for a backoff time interval, and wherein the wirelessly transmitting the discovery message includes:

wirelessly transmitting the discovery message at a first output RF power level;

waiting for a configuration request message;

in the case that no configuration request message is wirelessly received within a period of time, wirelessly re-transmitting the discovery message at a higher output RF power level; and repeating such waiting and re-transmitting until either a maximum output RF power level has been reached, or a configuration request message has been wirelessly received, such that the range of reception of the wirelessly transmitted configuration data message is limited.

17. A computer-readable medium as recited in claim 16, wherein the first output RF power level is a relatively low level, such that the range of reception of the wirelessly transmitted configuration data message is limited.

18. A computer-readable medium as recited in claim 16, wherein the generating includes generating random numbers, and wherein configuration parameters includes a security key.

19. A computer-readable medium as recited in claim 16, wherein the first wireless station is an access point (AP) of the network, and the second wireless station is a client station of the AP.

20. A computer-readable medium as recited in claim 19, wherein the wireless network substantially conforms to the IEEE 802.11 standard.

21. A computer-readable medium as recited in claim 20, wherein the configuration parameters includes a WEP key.

22. A computer-readable medium encoded with computer executable instructions that when executed by a processor in a first wireless station of a wireless network cause carrying out a method in the first wireless station, the method comprising:

wirelessly receiving a discovery message transmitted by a second wireless station;

wirelessly transmitting a configuration request message in response to wirelessly receiving the discovery message;

wirelessly receiving a configuration data message from the second wireless station, the configuration data message being transmitted by the second wireless station within a settable time interval in response to the second station receiving the configuration request message and after the second station waits for a backoff time interval;

extracting one or more configuration parameters from the configuration data message; and applying the one or more configuration parameters to the first wireless station to configure the first wireless station, such that the first wireless station can be automatically configured, wherein the transmitting of the discovery message by the second wireless station includes:

the second wireless station wirelessly transmitting the discovery message at a first output RF power level;

the second wireless station waiting for a configuration request message;

in the case that no configuration request message is wirelessly received by the second wireless station within a period of time, wirelessly re-transmitting the discovery message at a higher output RF power level; and the second wireless station repeating such waiting and re-transmitting until either a maximum output RF power level has been reached, or a configuration request message has been wirelessly received by the second wireless station, such that the range of reception of the wirelessly transmitted configuration data message is limited.

23. A computer-readable medium as recited in claim 22, wherein the first wireless station is configured only if a user selects the first wireless station to be configurable.

24. A computer-readable medium as recited in claim 22, wherein the wirelessly transmitting the configuration request message is in response to wirelessly receiving a command from a user.

25. A computer-readable medium as recited in claim 22, wherein the second wireless station is an access point (AP) of the wireless network, and the first wireless station is a client station of the AP.

26. A computer-readable medium as recited in claim 25, wherein the wireless network substantially conforms to the IEEE 802.11 standard.

27. A computer-readable medium as recited in claim 26, wherein the configuration parameters includes a WEP key.

28. An apparatus in, a first station of a wireless network, the apparatus comprising:
    means for wirelessly receiving;
    means for wirelessly transmitting; and
    means for responding, including means for waiting, the means for waiting configured to wait for a settable time interval for the means for wirelessly receiving to receive, the means for responding configured to respond, after the settable time interval, to receiving a configuration request message from a second wireless station, the means for responding including means for generating a configuration data message for the second wireless station including one or more configuration parameters for the second wireless station, and using the means for wirelessly transmitting to transmit the configuration data message to the second wireless station, such that the second wireless station can be configured,
wherein the configuration request message is wirelessly transmitted by the second wireless station in response to the discovery message being wirelessly received by the second wireless station,
wherein the transmitting of the configuration message is after waiting for a backoff time interval, and
wherein the means for wirelessly transmitting the discovery message includes:
    means for wirelessly transmitting a discovery message at a first output RF power level;
    means for waiting for a configuration request message;
    means for ascertaining whether no configuration request message has been wirelessly received within a period of time,
    means responsive to the means for ascertaining for wirelessly retransmitting the discovery message at a higher output RF power level if it is ascertained that no configuration request message has been receive within the period; and
    means for repeating such waiting and re-transmitting until either a maximum output RF power level has been reached, or a configuration request message has been wirelessly received such that the range of reception of the wirelessly transmitted configuration data message is limited.

29. An apparatus as recited in claim 28, wherein the first output RF power level is a relatively low level,
    such that the range of reception of the transmitted configuration data message is limited.

30. An apparatus as recited in claim 28, wherein the generating includes generating random numbers, and wherein configuration parameters includes a security key.

31. An apparatus as recited in claim 28, wherein the first wireless station is an access point (AP) of the wireless network, and the second wireless station is a client station of the AP.

32. An apparatus as recited in claim 31, wherein the wireless network substantially conforms to the IEEE 802.11 standard.

33. An apparatus as recited in claim 32, wherein the configuration parameters includes a WEP key.

34. An apparatus in first a station of a wireless network, the apparatus comprising:
    a wireless transceiver coupled to an antenna and able to wirelessly transmit and wirelessly receive messages to and from another wireless station;
    a processor coupled to the transceiver and configured to cause the wireless transceiver to wirelessly transmit a discovery message and to wait for a settable time interval to wirelessly receive a configuration request message from a second wireless station within the settable time interval the configuration request message being wirelessly transmitted by the second wireless station in response to the discovery message being wirelessly received by the second wireless station,
    in the case that the configuration request message is received from the second wireless station within the settable time period, the processor being further configured:
    to generate a configuration data message for the second wireless station including one or more configuration parameters for the second wireless station; and
    to cause the wireless transceiver to transmit the configuration data message to the second wireless station, such that the second wireless station can be configured,
wherein the transmitting of the configuration message is after waiting for a backoff time interval, and
wherein the wirelessly transmitting the discovery message includes:
    wirelessly transmitting the discovery message at a first output RF power waiting for a configuration request message;
    in the case that no configuration request message is wirelessly received within a period of time, wirelessly re-transmitting the discovery message at a higher output RF power level; and
    repeating such waiting and re-transmitting until either a maximum output RF power level has been reached, or a configuration request message has been wirelessly received, such that the range of reception of the wirelessly transmitted configuration data message is limited.

35. An apparatus as recited in claim 34, further comprising:
    a variable attenuator between the antenna and the transceiver to limit the transmit power.

36. An apparatus as recited in claim 34, the apparatus further comprising:
    a display that communicates the status of the configuration sequence to a user.

37. An apparatus as recited in claim 34, the apparatus further comprises:
    a user interface wherein the wirelessly transmitting the discovery message in response to the user interface wirelessly receiving a command from a user, such that the user can initiate the configuration.

38. An apparatus as recited in claim 37, wherein the command includes one or more selectors, each selector corresponding to a set of configuration parameters, and wherein the generating the configuration data message includes configuration parameters from the set of configuration parameters corresponding to the selector.

39. An apparatus in a first wireless station of a wireless network, the apparatus comprising:
- means for wirelessly receiving;
- means for wirelessly transmitting; and
- means for responding configured to respond to wirelessly receiving a configuration data message from a second wireless station, the responding to wirelessly receiving the configuration data message including extracting one or more configuration parameters from the configuration data message, and applying the one or more configuration parameters to the first wireless station, wherein the apparatus is configured such that the means for wirelessly transmitting transmits a configuration request message in response to wirelessly receiving a discovery message transmitted by the second wireless station, and wherein the configuration data message is transmitted by the second wireless station within a settable time interval in response to the second station receiving the configuration request message after the second station waits for a backoff time interval, such that the first wireless station can be configured, wherein the transmitting of the discovery message by the second wireless station includes:
- the second wireless station wirelessly transmitting the discovery message at a first output RF power level;
- the second wireless station waiting for a configuration request message;
- in the case that no configuration request message is wirelessly received by the second wireless station within a period of time, wirelessly re-transmitting the discovery message at a higher output RF power level; and
- the second wireless station repeating such waiting and re-transmitting until either a maximum output RF power level has been reached or a configuration request message has been wirelessly received by the second wireless station, such that the range of reception of the wirelessly transmitted configuration data message is limited.

40. An apparatus as recited in claim 39, wherein the first wireless station is configured only if a user selects the first wireless station to be configurable.

41. An apparatus as recited in claim 39, wherein the wirelessly transmitting the configuration request message is in response to wirelessly receiving a command from a user.

42. An apparatus as recited in claim 39, wherein the second wireless station is an access point (AP) of the wireless network, and the first wireless station is a client station of the AP.

43. An apparatus as recited in claim 42, wherein the wireless network substantially conforms to the IEEE 802.11 standard.

44. An apparatus as recited in claim 43, wherein the configuration parameters includes a WEP key.

* * * * *